Sept. 15, 1931.  H. W. A. LEHNERT  1,823,496
VALVE HANDLE
Filed April 30, 1928
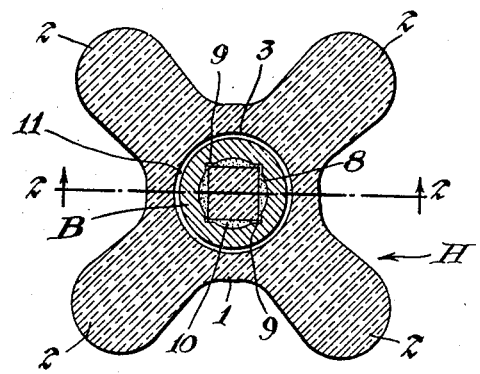
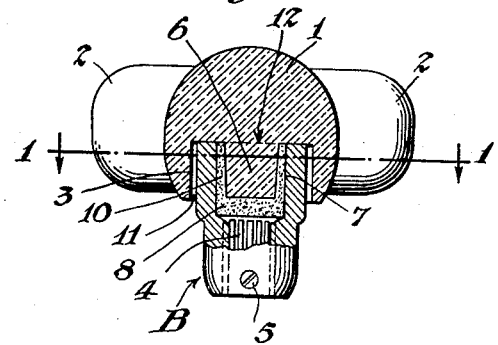

Patented Sept. 15, 1931

1,823,495

UNITED STATES PATENT OFFICE

HENRY W. A. LEHNERT, OF NEW YORK, N. Y.

VALVE HANDLE

Application filed April 30, 1928. Serial No. 273,814.

My invention relates to knob or handle structures, the utility of which is sufficiently understood in their application to cocks or faucets, and especially bath-tub, basin or sink faucets.

The principal objects are to provide a handle (usually of porcelain) and an attachment fitting therefor, which largely or entirely prevent cracking or splintering of the handle and consequent injury to users, such as occurs in many cases with handle structures of known types, to greatly reduce the tendency of the handle to loosen in relation to the attachment fitting, and to control or localize breakage of the handle (if breakage occurs) in such manner as to prevent injury to the user.

Knobs or handles of this type have heretofore been provided with a squared socket, in which the squared end of the attachment fitting, or bushing, is inserted and secured by cement. Expansion and constraction of the metal due to thermal changes tends to loosen the connection between the bushing and handle proper and especially the expansive force of the bushing end is exerted directly against the main body of the handle, which therefore frequently cracks or chips, producing sharp irregularities which often cut the user's hand. Breakage of the handle due to the strain of turning, or inherent flaws, also usually involves rupture of its main body, or hub, with similar risk of injury to the user.

To obviate these disadvantages and realize the objects or advantages above and hereafter mentioned, I provide a handle, the hub-socket of which has substantial clearance about the attachment bushing, and also provide centrally in the socket a lug which enters and is cemented in the bore of the bushing, thus providing secure connection of the two handle parts, reducing tendency of the handle to loosen, preventing fracture of the handle hub by expansion of the bushing, and confining fracture (if it occurs) in practically all cases, to the handle-lug.

The characteristics and advantages of the invention are further sufficiently explained in connection with the following detail description of the accompanying drawings, which shows an exemplifying embodiment. After considering this example, skilled persons will understand that many variations may be made, and I contemplate the employment of any structures that are properly within the scope of the appended claim.

In the drawings:

Fig. 1 is a section, at 1—1 of Fig. 2, of a handle structure embodying the invention in one form.

Fig. 2 is a section at 2—2, Fig. 1.

The handle proper, H, is usually of porcelain, and includes the central body or hub 1, radial lobes or knobs 2, and a hub-socket 3. The attachment fitting, or bushing, B, has a central aperture or bore, the lower or outward portion of which has the usual means, such as splines 4 and a set-screw 5, for secure and non-rotative connection to a faucet stem or the like (not shown).

At the center of the handle-socket is an integral lug 6, of polygonal—usually square—cross-section, located in the upper (or inward) portion 7 of the bushing-bore, and secured by cement 8. Non-rotative connection between the handle and bushing may be effected in various ways, but desirably for this purpose, the bushing-bore has longitudinal channels 9 in which the lug corners engage. The cylindrical segments of the bushing wall, opposite flat faces of the lug, provide spaces or pockets for substantial bodies of the securing cement, as at 10, thus increasing the security of connection between the handle and bushing.

The cylindrical wall of handle-socket 3 has substantial clearance from the outer surface of the bushing; that is, a substantial annular free space 11 is provided between the inner hub-wall and the bushing. Therefore any expansion of the bushing caused by heating, cannot cause contact between the bushing and the socket wall, and there is no possibility of expansive force being exerted to rupture the handle-hub.

An additional important safety feature is provided by practically controlling fracture of the handle (if fracture occurs); that is done by localizing the fracture-strains to the handle-lug 6, and particularly to the base thereof, where it joins the hub. Thus, if any excessive rotative force is applied to the handle, the lug will fracture or break away its base-line 12 (Fig. 2), and this fracture is "internal" or enclosed by the hub, so that the hand of the operator cannot come in contact with a fracture-surface.

I claim:

A handle structure for purposes described, comprising a porcelain handle including a hub portion having a socket and an integral lug projecting centrally therein, and a bushing having a portion within the socket and having an aperture in which the lug is located, the lug being of polygonal section and being formed with corners and the bushing aperture being generally cylindrical, providing substantial cement spaces between its wall and the bushing, cement in said spaces, and means in the cylindrical wall of said aperture for receiving said lug corners.

In testimony whereof I affix my signature.

HENRY W. A. LEHNERT.